Jan. 13, 1959 C. G. SONTHEIMER 2,869,087
MAGNETIC APPARATUS
Filed April 23, 1954 5 Sheets-Sheet 1
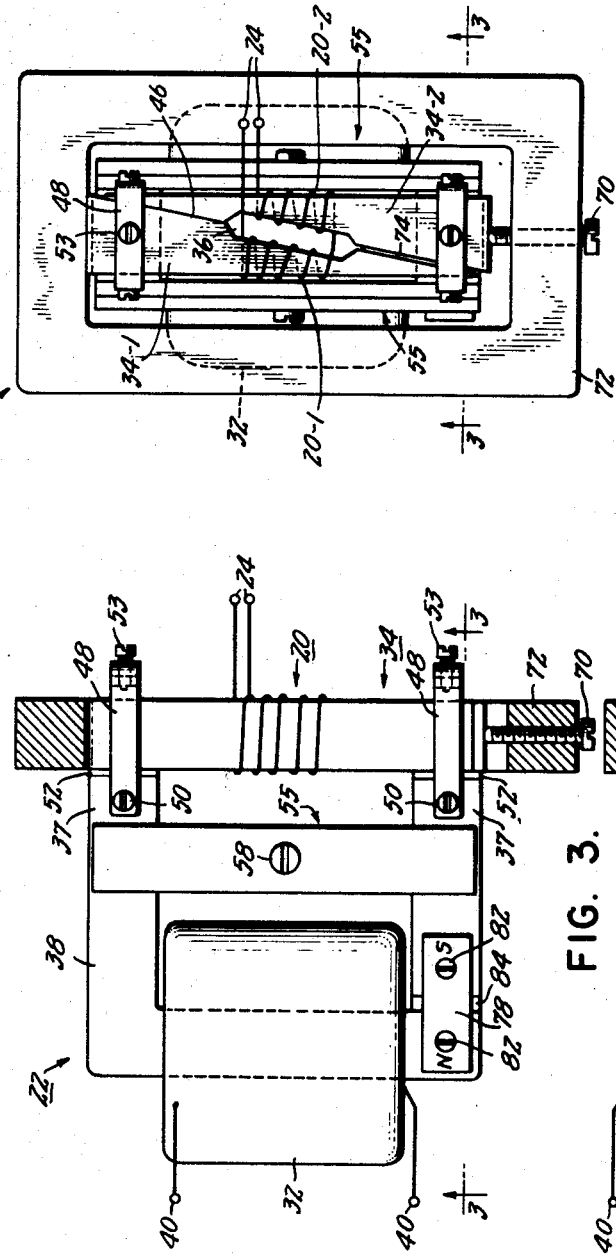
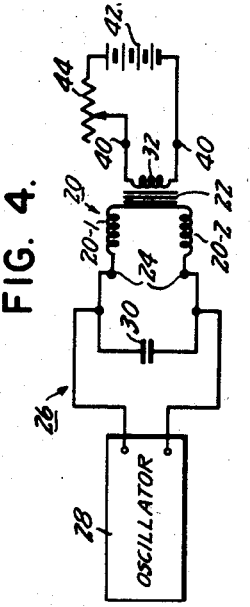
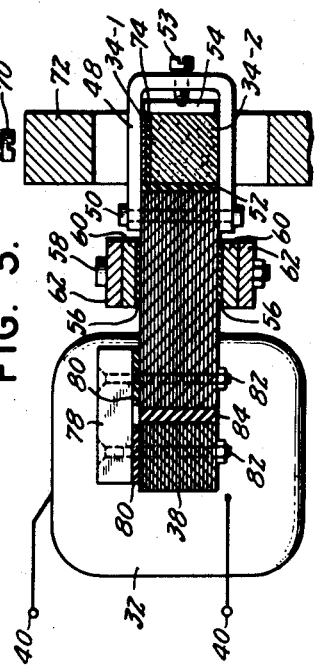
INVENTOR
CARL G. SONTHEIMER
BY
Curtis, Morris & Safford
ATTORNEYS Jan. 13, 1959   C. G. SONTHEIMER   2,869,087
MAGNETIC APPARATUS Filed April 23, 1954   5 Sheets-Sheet 2

INVENTOR
CARL G. SONTHEIMER
BY
Curtis Morris & Safford
ATTORNEYS

Jan. 13, 1959  C. G. SONTHEIMER  2,869,087
MAGNETIC APPARATUS
Filed April 23, 1954  5 Sheets-Sheet 3

INVENTOR
CARL G. SONTHEIMER
BY
Curtis, Morris & Safford
ATTORNEYS

Jan. 13, 1959  C. G. SONTHEIMER  2,869,087
MAGNETIC APPARATUS

Filed April 23, 1954  5 Sheets-Sheet 4

INVENTOR
CARL G. SONTHEIMER
BY
Curtis, Morris & Safford
ATTORNEYS

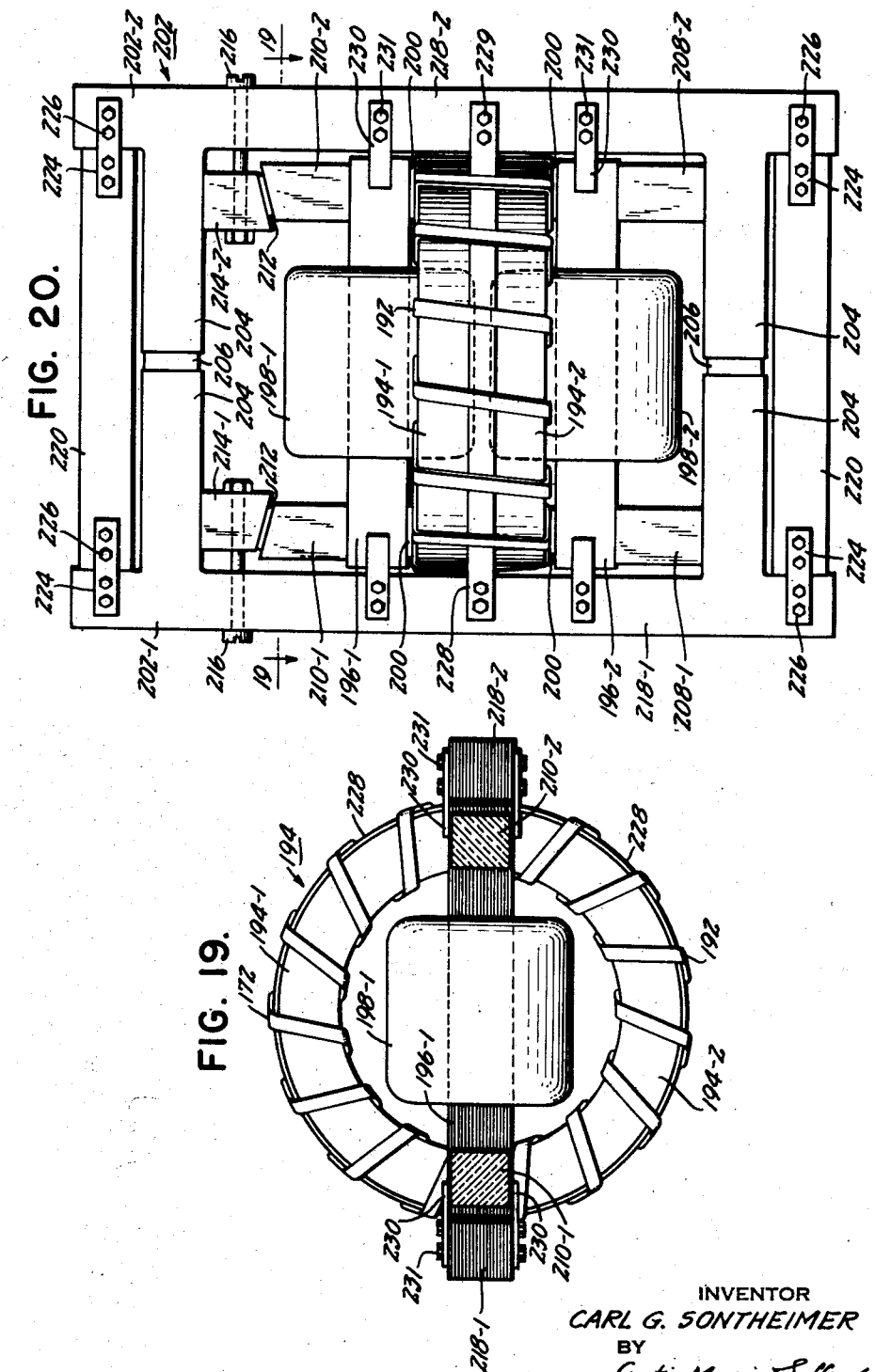

United States Patent Office 2,869,087
Patented Jan. 13, 1959

2,869,087

MAGNETIC APPARATUS

Carl G. Sontheimer, Riverside, Conn., assignor to C. G. S. Laboratories, Inc., Stamford, Conn., a corporation of Connecticut Application April 23, 1954, Serial No. 425,244

30 Claims. (Cl. 336—30)

This invention is in the field of high frequency saturable-core magnetic apparatus in which the inductance of a signal winding is controlled by varying the magnitude of a current through a control winding. More particularly, the present invention provides methods and apparatus for compensating these magnetic devices for variations in the characteristics of the cores, for adjusting them during production to eliminate undesired variations between devices, for facilitating their winding and assembly, and for improving the fabrication of cores, whereby variable inductors can be mass-produced with desired uniform optimum characteristics.

In such magnetic control devices, called controllable or variable inductors, the control and signal windings are wound on portions of the same or magnetically interconnected ferromagnetic core structures. Variations in the current flowing through the control winding changes the degree of magnetic saturation of desired portions of the core structure and so varies the effective inductance of the signal winding. Thus, the magnitude of an alternating current passed through the signal winding can be controlled in accordance with variations produced in the control current flowing through the control winding.

The development of ferromagnetic ceramic types of core materials, for example, such as those described by Snoeck in U. S. Patents 2,452,529; 2,452,530; and 2,452,531, and usually referred to as "ferrites," has permitted considerable higher frequency and wider-range operation of these controllable inductors. Their usefulness has been hampered by several undesirable characteristics of this ferromagnetic ceramic material. For example, this material is temperature sensitive; its loss characteristics, incremental permeability, hysteresis characteristics, effective "Q" and magnetic saturation sometimes vary markedly under moderate changes in temperature. Moreover, it has been found that in production different batches of the ferromagnetic ceramic core material behave in different and somewhat unpredictable fashion. At certain critical frequencies the material exhibits magnetostrictive properties which disturb inductor operation, at other frequencies increased hysteresis effects disturb the control characteristics.

The result of these factors is that the production of high frequency controllable inductors is at present a very specialized art and such devices are relatively expensive.

Among the advantages of the present invention are the provision of controllable-inductors having readily adjustable temperature, inductance, hysteresis, and effective "Q" characteristics, whereby units can be produced on a mass production basis and quickly adjusted to provide the desired characteristics.

Among the objects of the present invention is the provision of improved cores and methods of forming them from ferromagnetic ceramic material. In connection with aspects of the invention described herein, various portions of the core structure are formed from various materials and the forms of the core portions enable the use of readily wound or pre-formed windings, thus greatly reducing the cost.

It is another object of the present invention to provide improved controllable-inductor apparatus which is considerably cheaper and more useful for high frequency operation.

The various other objects, aspects, and advantages of the present invention will be in part pointed out and in part apparent from the following description considered in conjunction with the accompanying drawings, in which:

Figure 1 is a top view of a current-controlled controllable inductor;

Figure 2 is a side view of this same inductor, showing in particular the arrangement of the two portions of the signal winding;

Figure 3 is a cross-sectional view of this same controllable inductor taken along the line 3—3 of Figures 1 and 2;

Figure 4 is a schematic circuit diagram showing one application of the many possible applications for the controllable inductor of Figures 1, 2, and 3;

Figure 14:
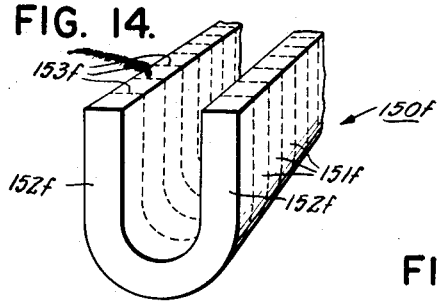
Figure 13:
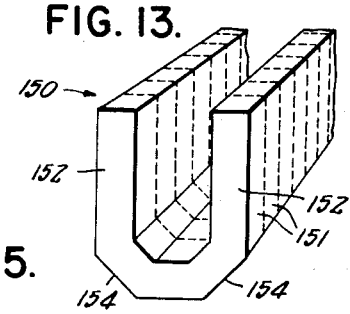
Figure 15:
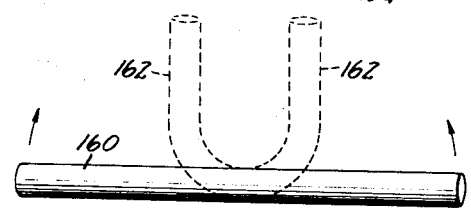
Figure 16:
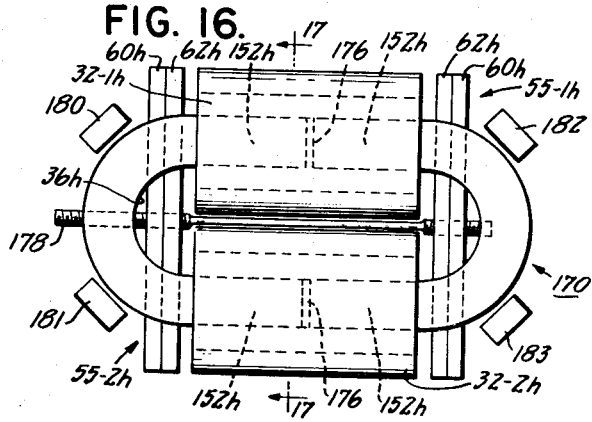
Figure 17:
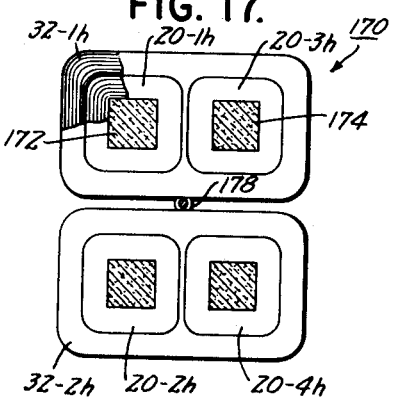
Figure 18:
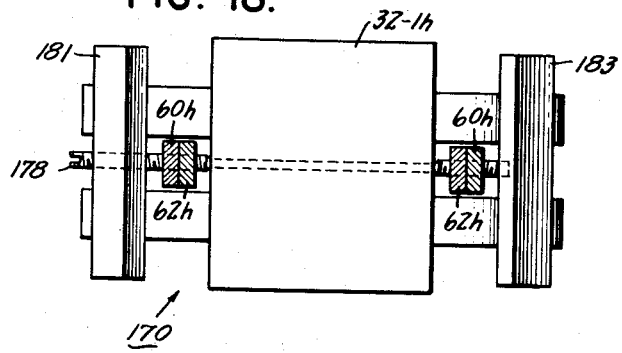

Figures 13, 14, and 15 are diagrammatic views to aid in explaining methods of core fabrication;

Figures 16, 17, and 18 are views of another variable inductor embodying aspects of the present invention; Figure 17 being a sectional view taken along line 17—17 of Figure 16;

Figure 19 is a plan view partially in section taken along line 19—19 of Figure 20, showing another form of controllable inductor; and Figure 20 is an elevational view of the controllable inductor shown in Figure 19.

In operation a signal winding 20 of the controllable inductor 22 shown in Figure 1 is connected by means of its terminals 24 to a circuit to be controlled, such as the oscillator circuit indicated at 26 in Figure 4, the controlled circuit being responsive to inductance changes in the winding 20. For example, as diagrammatically indicated the controlled circuit may include an oscillator 28 whose tank circuit comprises a fixed condenser 30 and the variable inductance winding 20. The current sent through a control winding 32 regulates the degree of magnetic saturation of the part 34 of the core associated with the signal winding and hence controls its permeability and the incremental inductance of signal winding 20.

In order to reduce the magnetic coupling between the windings 20 and 32, the signal winding 20 may be divided into first and second portions 20–1 and 20–2, with one portion wound around each of corresponding signal winding core portions 34–1 and 34–2 (Figure 2). These signal winding portions 20–1 and 20–2 are connected in series so that magnetic flux generated by current in the signal winding flows and in a closed path encircling the oblong opening 36 in the signal core portion 34.

As is best shown in Figure 1, the core of the controllable inductor 22 includes the signal core portions 34–1 and 34–2 which lie adjacent one another and form a bridge across the ends of the two legs 37 of a generally U-shaped control winding core portion 38 on the back of which is wound the control winding 32. During operation the terminals 40 of control winding 32 are connected to a controllable source of current, for example as diagrammatically indicated in Figure 4, to a current source 42 in series with a rheostat 44, which may be adjusted manually or automatically to regulate the amount of control flux within the U-shaped core 38 along the length of the signal core 34 on either side of the oblong signal opening 36. The series connection of the signal winding portions 20–1 and 20–2 discussed above tends to cancel out any net voltage induced in signal winding 20 by variations in the control flux passing through signal core portions 34–1 and 34–2.

To provide high frequency operation and a wide range of sensitive control, the signal core portions 34–1 and 34–2 include ferromagnetic ceramic material, while the U-shaped control core 38 may be formed from laminated transformer iron, as indicated by the cross sectional view in Figure 3, or may be formed of sintered powdered iron particles or of ferromagnetic ceramic material. The selection of core materials for the core portion 38 depends upon the desired control characteristics and upon the highest frequency components of the control current which are to be employed.

To provide ease of fabrication and assembly and to secure the compensation adjustment characteristics described below, the signal core is formed in the two wedge-shaped pieces 34–1 and 34–2 with recesses formed in their inclined adjacent faces so that when these core pieces are placed together along the inclined joint 46, with the narrower end of each piece adjacent the other's broader end, the oblong recess 36 results. In assembly the pre-wound or form-wound signal winding portion 20–1 is slid over the narrow end of the core portion 34–1 until it lies in the recess, and similarly the other winding 20–2 is slid over the narrow end of core portion 34–2.

A pair of U-clamps 48 (Figure 3) of non-magnetic material having a moderate or relatively large temperature coefficient of expansion, such as brass, which are suitably held by bolts or rivets 50 to the ends of control core 38, act to hold the two signal core portions together and to press them firmly against a pair of non-magnetic elastic spacers or shims 52 of rubber or plastic resting against the ends of the control core legs 37. These shims 52 are somewhat elastic. Any increase in force exerted by tightening up the adjustable clamping screws 53 which bear against clamping plates 54 resting against the ends of the portions 34–1 and 34–2 decreases the spacing between the ends of the control core portion 38 and the signal core 34. These spacers 52 form a pair of non-magnetic spaces of high reluctance each in series with the path of the control flux through a leg of the control core 38. This reluctance in series with either leg may be separately and independently reduced by tightening the screws 53.

Figure 8:
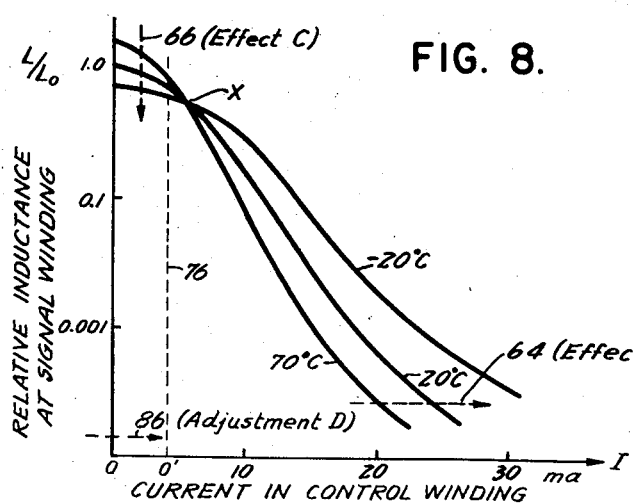
Figure 8 is a plot of curves of operating characteristics of controllable inductors with core portions of ferromagnetic ceramic, shown for purposes of explanation.

Sketched in Figure 8, which is a plot of the inductance of a control winding such as the winding 20 as a function of the control current through the winding 32, three curves of the normalized incremental inductance $L/L_0$ are shown, for $-20°$ C., $20°$ C., and $70°$ C., where $L_0$ equals the inductance at zero current at $20°$ C. It is seen that in this range of temperatures there is more than a 50% change in sensitivity of the control. An increase in temperature increases the sensitivity, that is, causes a greater change in the inductance for the same control current variation.

Because the clamps 48 are made of material which expands with temperature, any increase in sensitivity of core material 34 because of temperature increase is compensated by an expansion of the clamps 48 resulting in an increased reluctance through the elastic shims 52, which push the signal core portion 34 further from the control core portion 38 as the clamps 48 expand. It is seen that this control-flux-path series-reluctance compensation (herein called compensation effect A) caused by the clamps and the non-magnetic spaces 52 is most effective at larger values of control current (Figure 8), that is in the region of the tail ends of the curves, as they sweep downwardly to the right with decreasing values of $L/L_0$. Because of this compensation effect (A), increasing temperature tends to move these tail curve portions in the direction of the arrow 64, thus bringing the tails of the various temperature curves shown in Figure 8 more closely together to provide more uniform control characteristics, as desired.

A further temperature compensation of this portion of the curves is obtained by the magnetic shunting structure including two bi-metallic bars 55 (Figure 2) which is arranged in shunt with the control-flux-path through the core 34. This second compensation effect (B) is called control-flux-path shunt reluctance compensation. These bars are bridged across near the ends of the legs 37 of the control core 38 and form a shunt reluctance therebetween. An elastic, non-magnetic shim or spacer 56 of rubber or plastic-like material is placed between the ends of each bar 55 and the adjacent face of each leg 37. The centers of these bars are pulled toward each other by the compression adjusting bolt 58. To provide an effective magnetic shunt the inner metal layer 60 of the bars 55 adjacent the legs of core 38 are made of relatively low-reluctance magnetic material, such as mild steel, and the outer layers 62 are made of a material having a larger temperature coefficient of expansion and may be of either magnetic or non-magnetic material, for example, brass. Thus, as the temperature increases, the outer bi-metallic layer 62 expands more and compresses the shims 56, decreasing the reluctance in shunt between the legs of core 38. This has the effect of decreasing the amount of control flux passing through the core portion 34 and hence compensates the ferromagnetic ceramic core material for its increasing sensitivity with rising temperature. This compensation also obtains most of its effect at large values of control current, that is, in the tail regions of the curves to move them in the directions of the arrow 64, so as to tend to bring the higher temperature characteristics more nearly in coincidence with the lower temperature characteristics, in a manner similar to control effect (A) discussed above. That is, both the control-flux-path series-reluctance and shunt-reluctance compensation methods and apparatus, discussed in connection with the U-clamps 48 and the bi-metallic bars 55 are arranged to progressively shift the tail end of the curves in the direction of the dotted arrow 64, with increase in temperature, needed to compensate for changes in sensitivity of the signal core portion. The initial amount of series or shunt reluctance is pre-set by the adjustment screws 53 and 58, so that as the inductors are mass produced they can be set to the desired calibrated sensitivity in the high control current range.

In order to provide a signal flux-path series reluctance control effect (C) to adjust the vertical positions of the curves shown in Figure 8, an adjusting screw 70 and a rectangular frame 72 (Figure 2) are provided.

This adjustment and the compensation effect (C) may have some slight effect along the whole length of the curves, but the effectiveness is greatest in the upper portions of the curves near the dotted arrow 66. The compensation is automatic so that increases in temperature produce a greater shifting of the head ends of the curves down in the direction of the arrow 66, thus tending to bring them into coincidence as desired for uniform characteristics, independent of temperature changes. It is noted that these curves cross in a region "X" at a low value of control current. The effect (C) tends to move region "X" nearer the head of the curves, which is desired and is advantageous in connection with compensation effect (D) discussed below.

As seen best in Figure 2, the frame 72 surrounds the signal core portion 34, and the wider end of the core part 34-1 abuts against the inside of frame 72, and on the opposite side the adjusting screw 70 bears against the broad end of the core part 34-2. A thin separator or spacer 74 of elastic non-magnetic material such as rubber or plastic-like material is placed along at least one end of the inclined junction 46 to form a non-magnetic gap in series with the signal flux path around the hole 36. As the screw 70 is advanced, it closes the gap formed by the spacer 74 by wedging the pieces 34-1 and 34-2 into the U-clamps 48, hence decreasing the reluctance in series with the signal flux. This increases the inductance, thus raising the curves, and vice versa when the space 74 increases. This up or down shift of the curves is most marked when the signal core material is at greatest permeability, which is in the low control current range, as mentioned above. The spacer 74 may be made of a thermosetting or age drying plastic or glue-like material, in which case during production the screw 70 and frame 72 are used to obtain the desired characteristics and then the spacer material is set so as to permanently fix the series-reluctance signal flux gap. An advantage of using a spacer 74 which retains some degree of elasticity is that increases in temperature expand the clamps 48 and so allow an expansion of the spacer 74 to lower the head ends of the curves in the direction of arrow 66. A pair of shims 74 may be used, one on each side of the slot 36.

To provide a control flux zero-current ordinate adjustment control effect (D) for adjustment of the horizontal position of the zero control current point, that is, effectively to shift the origin from the position shown (Figure 8) toward and away from the position of the dotted ordinate 76 shown passing through the shifted origin 0', a permanent magnet 78 (Figure 1) is bridged across a region of increased series reluctance in the control flux path. As shown in Figure 3, the magnet 78 is adjustably spaced from the core 38 by elastic non-magnetic spacers or shims 80 of rubber or plastic-like material and by adjusting screws 82 so that the magnet bridges the series reluctance created by the non-magnetic spacer 84. Tightening the bolts 82 increases the permanent flux in the core 38 and shifts the zero-control-current point in the direction of the arrow 86, for example, over to the dotted ordinate 76. As seen in Figure 8, this shifts the zero-control-current ordinate toward the region marked "X" in which the various temperature curves for any given sample of ferromagnetic ceramic all converge and cross one another. In many applications it is desirable to shift the origin-ordinate 0'—76 to the right until it passes through zone "X." In mass-producing variable inductors for such applications, the first adjustment made after assembly is to tighten screws 82 until the ordinate 76 for zero-control-current passes through region "X." Since control effect (C) tends to move area "X" up toward the left in Figure 8, the required amount of adjustment 86 is reduced, and so the necessary magnet size is reduced.

Among the advantages of the wedge-shaped signal core pieces 34-1 and 34-2 is the decrease in magnetostrictive effects at the critical frequencies which is obtained by having the pieces tapered and having the slot skewed. By reducing the magnetostriction at resonant frequencies, the operation becomes more uniform, for less energy is wasted in vibrating the core 34, and hence the "Q" of the signal winding is increased, increasing the effectiveness of control. Moreover, the corners of the opening 36 are tapered, thus guiding the control and signal fluxes more smoothly around the slot 36 and substantially preventing any sharp corner regions of low flux density.

Also, since the winding portions 20-1 and 20-2 may be form wound or pre-wound with a form, the inside of the form or the inside of the winding itself slides into the recesses on the core pieces 34-1 or 34-2 more readily with the corners of the hole 36 tapered as shown.

Another advantage of the signal-flux-path series reluctance space 74 is the apparent marked reduction in hysteresis in control effect due to hysteresis of the signal core ceramic material 34. This improvement may be explained by assuming that the gap 74 acts as a demagnetizing or linear element in series with the flux path and hence greatly reduces the hysteresis characteristics as seen at terminals 24 in terms of the control current applied through terminals 40.

Thus, by means of the four types of adjustment discussed above: (A) control-flux-path series reluctance, (B) control-flux-path shunt reluctance, (C) signal-flux-path series reluctance, and (D) control-flux zero-current ordinate adjustment, a mass-produced variable inductor 22 can be adjusted to have any of a wide range of predictable characteristics, and automatically compensates itself for changes in temperature. Hence it is a relatively simple matter to reproduce over and over again in mass-produced batches of variable inductors any desired type of control characteristics.

Moreover, the method and apparatus for effects A. B, and C are such that changes in temperature cause the higher temperature curves to be shifted toward coincidence with the lower temperature curves, so that temperature compensation is automatic after the inductor units are factory adjusted on a mass-production basis.

It will be apparent that the core portion 34 can be formed of two rectangular core pieces with the junction 46 and the signal winding slot extending parallel with the outer edges of the core, that is, parallel with the direction of the flux produced by the control current. If desired the core 34 may be formed from a single piece of ferrite or other suitable magnetizable material. The slot for the winding 20 may be drilled or cast into this piece of magnetizable material.

Figure 5:
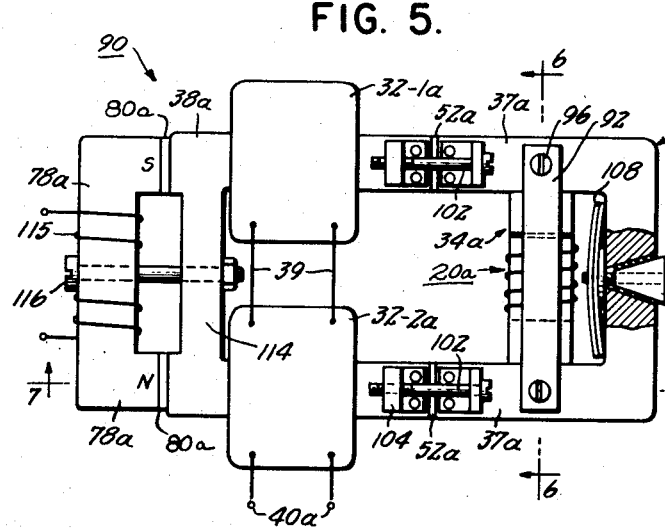
Figure 5 is a top view of another current-controlled controllable inductor.
Figure 6:
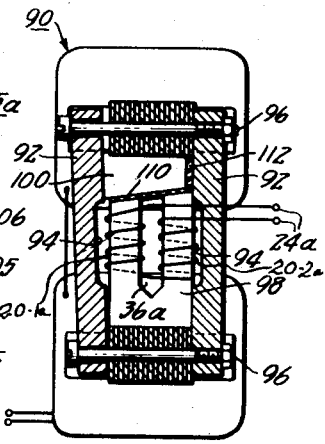
Figure 6 is a side view of this same inductor showing in particular the arrangement of the two portions of the signal winding.
Figure 7:
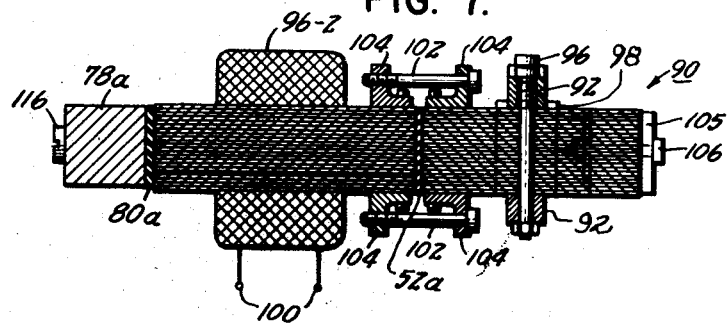
Figure 7 is a cross-sectional view of this same controllable inductor taken along the line 7—7 of Figures 5 and 6.

In Figures 5-7 is shown another controllable inductor indicated at 90 having certain parts performing functions corresponding to those performed by parts of the inductor 22 and indicated by corresponding references followed by an appropriate suffix. The inductor 90 has a signal winding 20a with series-connected portions 20-1a and 20-2a and terminals 24a and a control winding divided into two equal portions 32-1a and 32-2a located on opposite side legs 37a of the control core 38a and either series or parallel connected by leads 39 and having control terminals 40a.

In the variable inductor 90, the control core portion 28a is generally U-shaped with a signal core portion 34a and a shunt control portion 55a bridge across the ends of the two control core side legs 37a. As shown in Figure 6, the signal core portion 34a may be arranged between the ends of the legs 37a and held in place by a pair of clamping bars 92 of a broad U-shape with recesses 94 in the inside of the clamps 92 to provide clearance for windings 20-1a and 20-2a, clamps 92 being held by a pair of adjusting bolts 96. This signal core 34a comprises a bifurcated core portion 98 with unequal leg length and a wedge core portion 100.

In assembly one of the signal winding parts 20-1a and 20-2a is slid over each of the opposed core legs of bifurcated core 98 and connected in series so that signal flux encircles the oblong oval opening 36a in a closed path, so as to reduce coupling with the control windings 32-1a and 32-2a.

In order to provide control-flux-path series reluctance adjustment, the control core legs 37a are each divided by a non-magnetic elastic spacer 52a arranged approximately transversely of the control flux path. This spacer is of material such as the spacers 52 in inductor 22 and performs in a manner corresponding thereto. The adjustment of the gaps 52a is made by adjusting screws 102 associated with pairs of bracket clamps 104, forming a U-shaped clamping structure, either the screws or clamps being non-magnetic. Tightening these screws reduces the series reluctance, and in order to provide an increase in reluctance with increase in temperature, screws 102 are made of material with a relatively large temperature coefficient of expansion, for example, of material such as brass. This provides the (A) control effect, arrow 64, discussed above in connection with gaps 52 in the inductor 22.

To provide a control-flux-path shunt reluctance control adjustment (B) the shunt magnetic structure 55a is bridged across from the end of one control core leg 37a to the other. A wedge-shaped notch is formed in the shunt structure 55a, and a ferromagnetic wedge-shaped bridge 105 is fitted therein between a pair of non-magnetic elastic spacers 56a having the properties and an effect corresponding to the shims 56 shown in Figure 3. The bridge 105 is adjustably secured in place by a screw 106 passing into the center of an arched bi-metallic strip 108 having its more expandable layer away from the bridge 105. Thus, increasing temperature pulls bridge 105 further into the structure 55a and decreases the shunt reluctance bridging the signal core 34a, providing a control and compensation effect (B), such as discussed above.

A signal-flux-path series reluctance control effect (C) is provided by the wedged shaped signal core portion 109 in conjunction with a non-magnetic elastic spacer 110 of material such as the shim 74 in the inductor 22. Like the spacer 74, the spacer 110 may extend only on one side of the hole 34a, or may twice interrupt the signal flux path around the oblong hole 36a in the signal core as shown. A second elastic shim 112 between the narrow end of the wedge 100 and the clamp 92 acts as a spring tending to drive the wedge signal core portion out to one side and against the opposite clamp 92. Thus, tightening the clamp bolts 96 reduces the signal-flux-path series reluctance gap 110. The bolts 96 are of a relatively high temperature coefficient of expansion to increase the signal-flux-path series reluctance; hence producing the desired compensation effect (C).

The zero-control-current ordinate adjustment (D) in the variable inductor 90 is produced by a C-shaped permanent magnet 78a whose pole tips are adjacent either end of a zone of increased reluctance created by the reduced cross sectional area of the back 114 of the control core 33a. Non-magnetic elastic shims 80a are used, and the adjustment 86 (Figure 8) is provided by tightening the bolt 116. Electromagnet winding 115 may be used for compensation effects. The core 34a also has a reduced magnetostrictive effect as does core 34, for one end of the hole 36a and the signal core piece 100 are both skewed and the signal core leg lengths are unequal.

An apparent reduction in the hysteresis of the signal winding 20a is also obtained because of the series gap 110, having an effect like space 74 shown in Figure 2.

In Figures 9 and 10, and Figures 11 and 12 are shown two controllable inductors in which the control windings and control core structures substantially enclose the signal windings and signal core portions.

Figure 9:
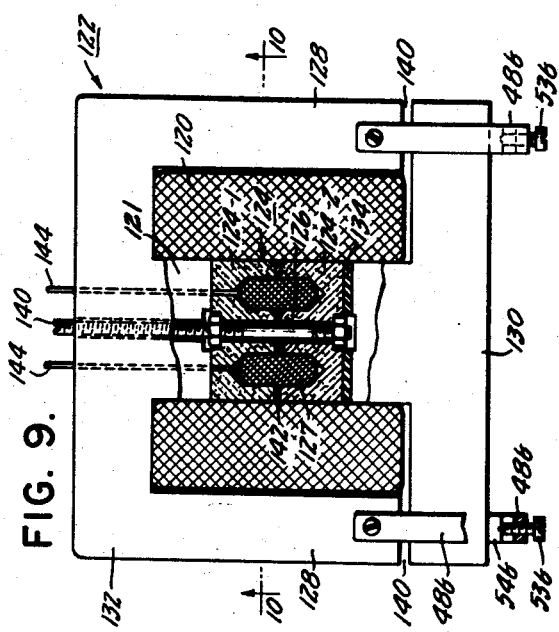
Figure 9 is an elevational and partial cross-sectional view of another form of controllable inductor.
Figure 10:
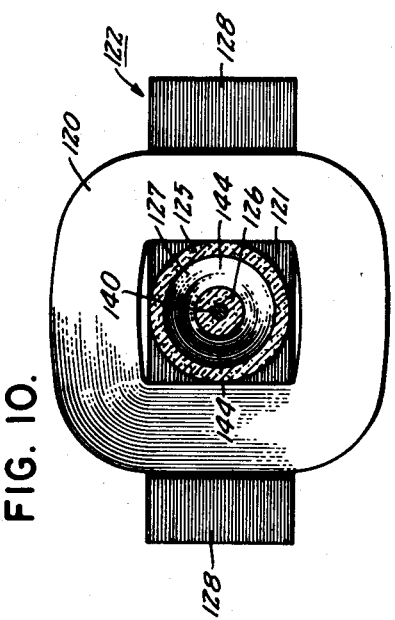
Figure 10 is a cross-sectional view taken along the line 10—10 of Figure 9.

In the embodiment of Figures 9 and 10 a multi-turn control winding 120 is wound around the truncated center leg portion 121 of a shell-type control core 122, which may conveniently be composed of stacks of E-shaped and T-shaped laminations arranged to provide the large clearance in the center leg, in which is placed the signal core 124. For higher control frequency operation, the control core may be made of powdered iron or ferromagnetic ceramic material such as ferrite. The signal core 124 is divided into two identical portions 124–1 and 124–2 formed of ferromagnetic ceramic and are bodies of revolution having an annular rim 125 and a raised central cylindrical plug 126 providing a central core for a signal winding 127. Winding 127 is a form wound or pre-wound annular winding concentric with the control winding.

In operation the control flux follows two identical paths, passing along the lengths of both outside core legs 128 and then converging to pass through the center leg 121 and through the signal core 124. The signal flux bows axially of the cylindrical central core piece 126 and returns axially of the rim 125.

In order to provide an automatic control-flux-path series reluctance adjustment, the U-shaped clamps 48b are used to hold the ends of the T-shaped control core portion 130 near the ends of the legs 128 of the E-shaped control core portion 132, and a non-magnetic elastic washer spacer 134 is clamped between the back of signal core portion 124–2 and the center leg of the T-shaped core portion 130. By tightening the adjustment screws 53b which force clamping blocks 54b against opposite ends of the T-shaped core 130, the series reluctance of the non-magnetic gap through spacer 134 and also the two series reluctances of the gaps 140 are decreased. The clamps 48b have a large temperature coefficient of expansion automatically to provide the compensation effect (A).

To permit adjustment (C) of the reluctance of the series signal-flux path, a double-threaded screw 140 is used passing through an axial hole in the center control core leg 121 and having its reverse-threaded end passing through the center signal core leg 126 with oppositely threaded nuts fitted into locking recesses in the backs of signal core parts 124–1 and 124–2. An elastic non-magnetic spacer 142 is placed between the two halves of the signal core. Thus, by means of the screw 140 the series reluctance in the signal flux path can be adjusted during manufacture as desired. Moreover, by using a material in this screw having a relatively great temperature coefficient of expansion, the reluctance of the gap 142 is increased with increasing temperature to provide automatic compensation, effect (C).

In order to make electrical connection with the signal winding 127, its ends 144 are brought out through a pair of symmetrically arranged holes passing through one half of the control core center leg 121 and through the signal core portion 124–1 between the rim 125 and the embossed cylinder 126.

The effective "Q" of the signal winding is increased, particularly for higher values of control flux, by making the bottom of the annular signal-winding recess between the rim 125 and center 126 of the signal cores 124–1 and 124–2 rounded or pointed as shown, thus guiding the control flux more smoothly through the signal core substantially uniformly to saturate the core and allowing signal flux more smoothly to flow around the winding 127. With this construction, both the control and signal cores can be form wound and in assembly are merely slipped in place around their respective center core portions.

Figure 11:
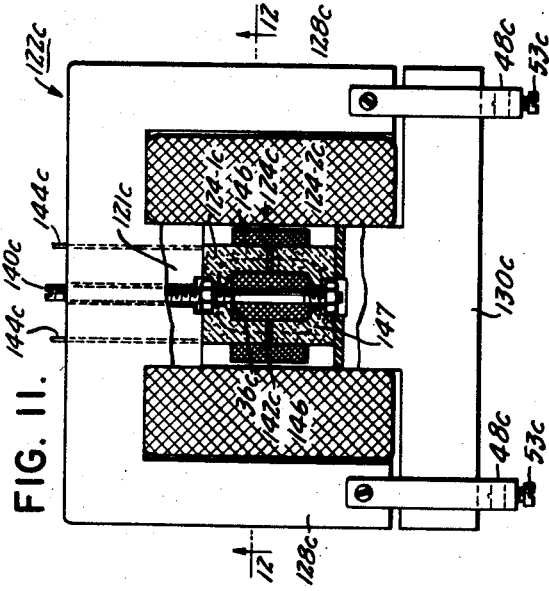
Figure 11 is an elevational and partial sectional view of still another controllable inductor.
Figure 12:
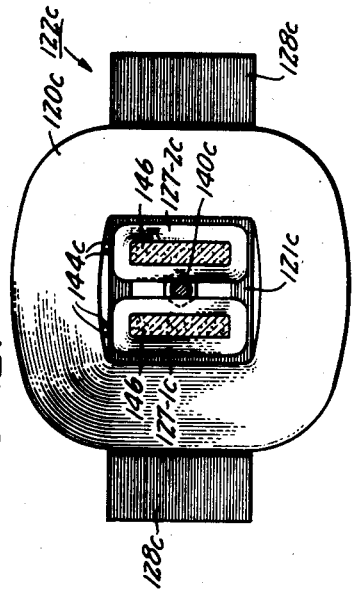
Figure 12 is a cross sectional view taken along line 12—12 of Figure 11.

In the controllable inductor of Figures 11 and 12 parts performing corresponding functions have reference numbers corresponding to those in Figures 9 and 10 followed by an appropriate suffix. The signal core 124c is of a generally oval or oblong shape. A pair of U-shaped cores 124–1c and 124–2c having straight legs 146 are arranged with the ends of their legs juxtaposed on opposite sides of a pair of elastic non-magnetic spacers 142c which are under compression and exert an outward force similar to that exerted by the spacers 142 in Figure 9.

The signal winding 127c is divided into two portions, 127–1c and 127–2c, one being placed around each of the straight legs 146 of the signal core and being connected in series so that the signal flux flows in a closed path as indicated by the broken line 147 in Figure 11.

A control-flux-path series reluctance compensation effect (A) is obtained by means of the adjusting screws 53c and U-clamps 48c in a manner similar to that described in connection with Figure 9.

A signal-flux-path series reluctance compensation effect (C) is obtained by means of the non-magnetic gaps 142c in series with the signal flux encircling the central oblong opening 36c. The initial factory setting of this compensation is obtained by the screw 140c.

Among the advantages of the variable inductor shown in Figures 11 and 12 are those flowing from the fact that the signal winding can be form wound and during assembly its two halves are merely slipped over the straight leg portions 146 as the two halves of the signal core are assembled into the oblong core shape shown in Figure 11. Moreover, the coupling with the control winding is substantially eliminated by this connection of the two signal winding portions. The two terminating leads 144c are brought out from the signal winding by threading them axially along the side of the center leg 121c of the control core underneath the turns of control winding 120c.

Figures 13, 14, and 15 illustrate various ways of making the U-shaped halves of the oblong type of signal winding cores such as core 124c with straight side leg portions, the joints between the two core pieces occurring in these straight leg portions. As shown in Figure 13 the first step in one process according to the invention is to extrude a long trough 150 of unfired ferromagnetic ceramic mixture, such as ferrite, which in its unfired state has a pliability consistency somewhat like putty. The trough or generally U-shaped or C-shaped tube or channel 150 is then cut crosswise, as along the line 153, into a number of U-shaped or C-shaped pieces 151 having legs 152. These core portions are then fired in a furnace which converts them into their final ceramic form. For some applications the straight side members of the tube or channel 150 may be wider or higher, depending upon the desired length of straight sides 152 of the individual core pieces 151. In certain types of applications it is advantageous to have the cross section of the signal flux path around the oblong central opening or slot 36d more uniform, and hence the outer corners 154 of the back of the channel are cut off during the extrusion process. The core pieces 151 are identical with the pieces of the core 124c and may be made in a manner similar thereto except for the chamfer on the corners 154 of the back.

Another example of a core which may be extruded as a tube and then cut into core pieces is core 34 (Figure 2) having portions 34-1 and 34-2 with their inclined joint 46. Alternatively the parts 34-1 and 34-2 may be individually cut from an open channel having a cross-sectional shape such as portion 34-1.

Among the advantages of this process of extruding the ceramic core mixture, then severing off the core portions at the desired angles, and firing the resulting portions to form core pieces are the elimination of troublesome core mold problems and an improved performance of the completed core. The electrical characteristics of ceramic core pieces which have been extruded and fired are considerably better than those of similarly shaped pieces made in molds and then fired, e. g. their effective "Q" is higher.

In Figure 14 is shown a trough or channel-shaped extruded core mixture 150f from which core pieces 151f are severed off along the dotted boundaries 153f by passing a knife blade transversely to the length of the channel, the resulting C-shaped or U-shaped core portions having straight legs 152f.

As shown in Figure 15 such core pieces may be formed by the process of extruding a bar 160 of unfired ceramic mixture having a round or polygonal cross section, then severing off desired lengths, bending both straight ends in the same direction into core legs as indicated by the phantom lines 162, and then firing them into their final ceramic form. An advantage of this latter process is that the closed signal flux path in the core 162 around the oblong slot 36 of which is formed when the legs of two cores are aligned and butted end-to-end, may have a more nearly round cross section. In general a signal core having a circular cross section for its signal flux path is 15% better in performance than an otherwise similar core with a square cross section, and similarly with other cross sections; the improvement over a rectangular cross section is even more marked.

In Figures 16, 17, and 18 is shown a controllable inductor 170 embodying aspects of the present invention and particularly adapted to use extruded cores formed by processes such as described in connection with Figures 13, 14, and 15. Inductor 170 includes a pair of signal cores 172 and 174 each having a central oblong opening 36h (only one seen in Figure 17) and a pair of straight leg portions 152h aligned and abutted against the corresponding leg portions of the other half of the core. A signal winding 20h is divided into four form-wound parts, 20–1h, 20–2h, 20–3h, and 20–4h, a pair of which 20–1h and 20–2h are placed around each of legs 152h of core 172 and a pair of which 20–3h and 20–4h are placed around corresponding legs 152h of core 174, the two parts on each of the cores 172 and 174 being arranged in series aiding connection so that during any half cycle of the signal current the signal flux flows in these two cores around the openings 36h. In order to minimize any magnetic coupling with the control winding portions 32–1h and 32–2h, the signal flux flows in opposite directions in the two signal core portions 172 and 174, while control windings 32–1h and 32–2h may be connected in series or parallel to produce control flux flowing in the same direction in both cores 172 and 174.

Adjustable means, not shown, are provided for regulating the size of non-magnetic gaps 176, which are in series with both the control and signal fluxes. These adjustments may be made temperature-responsive in a manner as shown above, and so produce a combination of effects "A" and "C" by a single type of adjustment and compensation. Additionally, a shunt adjustment of the control field is obtained by the bi-metallic bars 55–1h and 55–2h which extend across adjacent end openings of the control windings 32–1h and 32–2h and can be moved toward and away from these windings by double-threaded adjusting screws 178. The bars 55h serve to shunt an adjustable fraction of the control flux which would otherwise pass through the arcuate portions of the cores 172 and 174. The low expansion and high expansion bi-metallic layers 60h and 62h, respectively, are arranged with the latter layer adjacent the control cores so as to move shunts 55h closer thereto with increase in temperature thus increasing the shunting effect to produce control effect "B."

In order further to reduce hysteresis effects in the inductance control action, four adjustable core-to-core shunts 180, 181, 182, 183, may be used. These shunts act to equalize the distribution of the control flux between the upper and lower cores 172 and 174 in which it flows in the same direction. The signal flux is flowing in opposite direction in these two cores so that shunts 180, 181, 182, and 183 allow some of this flux to flow in portions of both cores. For example, signal flux may flow to the left through the rear leg 152h of upper core 172, down through shunt 180, then back toward the right in core 174 and up through shunt 182. A similar but reversed hysteresis-control loop utilizes the other two shunts 182 and 183. It is understood that temperature compensation may be obtained by providing temperature-responsive adjusting means for moving shunts 180—183 toward or away from cores 172 and 174.

Figures 19 and 20 show a controllable inductor 190 embodying further aspects of the present invention, particularly adapted for high frequency relatively high power operation. In this inductor the signal winding comprises a total of about 15 turns or less of a braided conductive ribbon 192 about ¼ inch wide wound spirally around an annular ferromagnetic ceramic signal core 194, which may be formed by extrusion and slicing in a manner similar to that described in connection with Figures 13, 14, 15, and 16, except that the side portions of the core are not cut.

In operation, all of the signal flux flows around within annular signal core 194 in the same direction during any half cycle of the signal flux. The control flux flows in opposite directions within the semi-circular halves 194–1 and 194–2 of signal core 194. In order to create a strong control flux which divides between the signal core portions 194–1 and 194–2 in this manner to minimize coupling with the signal winding, a pair of field core portions 196–1 and 196–2 are used extending parallel to each other and diametrically across the signal core 194, with control winding portions 198–1 and 198–2 thereon, respectively. As seen in Figure 19, the straight bars 196–1 and 196–2 may be laminated, or alternatively, powdered iron or ferromagnetic ceramic may be used for applications requiring higher frequency components in the control flux path. Four non-magnetic shims 200 are used, one being placed between the end of each of the field core portions and the adjacent side of signal core 194. These shims or spacers 200 may be of a resilient rubber or plastic material to allow desired variations in the non-magnetic gaps produced thereby, which gaps are seen to be in series with the control flux path.

In order to produce a control effect "A" by increasing the non-magnetic gaps 200 with increases in temperature, a generally rectangular magnetic frame 202 is provided, as seen in Figure 21. This frame 202 is divided into two portions 202–1 and 202–2 and serves as a control flux path shunt, as explained hereinafter. Each of the portions 202–1 and 202–2 has inwardly projecting arms 204 near its respective ends, and the inner ends of these arms are spaced apart a predetermined relatively fixed distance by the non-magnetic spacers 206 to set the maximum control flux path shunt effect, as explained below. In order to clamp the field core portion 196–2 firmly against the two adjacent spacers 200, a pair of clamping blocks 208–1 and 208–2 are placed between the sides of the arms 204 and the ends of the field core 196–2. These clamping blocks are made of non-magnetic material and preferably have a relatively low coefficient of expansion; for example, a porcelain material may be used. The other field bar 196–1 is clamped against its spacers 200 by means of clamping blocks 210–1 and 210–2 having inclined end surfaces against which bear lubricating shims 212 and between these shims and the other arms 204 are wedge blocks 214–1 and 214–2. A pair of bolts 216 passing through holes in frame 202 are used to adjust the positions of the blocks 214 with respect to the mating blocks 210 and hence to adjust the force with which the control field portions 196 press against the shims 200. By tightening up on bolts 216, the size of the gaps 200 are reduced, which reduces the amount of reluctance in series with the control field flux path.

An automatic temperature compensation is obtained in the following manner: the bolts 216 are adjusted to produce the desired sensitivity at the temperature in which the adjustment is made. Then as the temperature increases the sides 218–1 and 218–2 of frames 202–1 and 202–2, respectively, expand while the clamping blocks 208 and 210 expand much less, due to their shorter length and lower coefficient of expansion. The net effect is to allow the non-magnetic gaps 200 to increase, providing an increase in control flux path series reluctance, i. e. producing control effect "A."

In order to produce control effect "B" the sides 218–1 and 218–2 of the frame 202 are arranged to pass fairly close to the ends of the control cores 196, and they are held in a relatively fixed position by means of the two braces 220, one at either end of the frame secured to the ends 222 of the sides 218–1 and 218–2 by plates 224 and bolts 226. These braces are of non-magnetic material having a relatively small temperature coefficient of expansion. Thus, as the temperature increases, the control cores 196 expand and their ends approach more closely to sides 218 so that a portion of the control flux from both control cores is shunted away from the signal core portion 194 and flows through the opposed pairs of arms and across the gaps 206. Also, with increase in temperature the arms 204 expand longitudinally and reduce the size of the gaps 206, thus further reducing the control flux path shunt reluctance to produce control effect "B." The size of the gaps 206 is chosen such that at the upper end of the operating temperature range the gap 206 becomes a predetermined minimum and the shunting action is a desired maximum.

From the above description it will be understood that a pair of the plates 224 and bolts 226 can be replaced by suitable adjusting means to vary the gaps 206 as desired, the shims 206 being of a resilient plastic or rubber-like material to allow change in the gap size with adjustment or change in temperature.

A pair of semi-circular bands 228 secured to frame sides 218–1 and 218–2 by bolts 229, seen in Figure 19, serve to hold signal core 194 within frame 202. The field cores 196 are held between the free projecting ends of arms or tabs 230, which are also fastened to the frame sides 218 by bolts 231.

From the above description it will be understood that controllable inductors embodying the present invention are well adapted to attain the ends and objects set forth herein, are readily mass-produced, and are adjustable and temperature and hysteresis compensated, and that the various embodiments of the invention shown herein can be modified so as to produce operating characteristics best suited to the needs of each particular use.

I claim:

1. A temperature-compensated electrically-variable inductor comprising a signal core portion of ferromagnetic ceramic material, said signal core portion having at least one opening therein, a signal winding coupled to said signal core portion whereby a signal current flowing therein induces a signal flux in said signal core portion passing around said opening, a relatively high reluctance region in series with said signal flux passing around said opening, a first temperature-responsive member arranged to increase the reluctance of said region with increasing temperature, a control core portion of ferromagnetic material, a control winding coupled to said control core portion and arranged to induce a control flux therein in response to the flow of control current through said control winding, said control core portion being magnetically coupled to said signal core portion whereby said control flux also passes through said signal core portion to control the effective inductance of said signal winding, a high reluctance area in series with said control flux, a second temperature-responsive member associated with said high-reluctance area and arranged to increase the reluctance of said area with increasing temperature, a third temperature-responsive shunting member arranged to control a shunt path to shunt some of said control flux away from said signal core portion, said shunting member being responsive to increasing temperature to reduce the reluctance of said shunt path, whereby to shunt more of said control flux away from said signal core, and an auxiliary source of flux arranged to establish a predetermined amount of flux in said signal core portion.

2. A temperature-compensated electrically-variable inductor comprising a signal core portion of ferromagnetic ceramic material, a signal winding on said signal core portion, a control core portion of ferromagnetic material adjacent at least two spaced points on said signal core portion, a control winding on said control core portion arranged to induce a magnetic control flux in a control flux path passing through said control core portion and through said signal core portion between said two spaced points, a non-magnetic gap in series with said control flux path for regulating the series reluctance of said control flux path, a temperature-responsive structure bridging said gap, said structure being responsive to variations in temperature to vary said gap, thereby adjusting the effective series reluctance in said control path with changing temperature.

3. A temperature-compensated electrically-variable inductor comprising a ferromagnetic ceramic signal core portion, a signal winding on said signal core portion, a control core portion of ferromagnetic material, a control winding on said control core portion and arranged to produce a control flux therein in response to the flow of control current through said control winding, said control core portion being magnetically coupled to said signal core portion whereby said control flux also passes through said signal core portion, a high reluctance area in series with said control flux, and a temperature-responsive element associated with said high-reluctance area and arranged to increase the reluctance of said area with increasing temperature.

4. A temperature-compensated electrically-variable inductor comprising a signal core portion of ferromagnetic ceramic material, a signal winding on said signal core portion, a control core portion of ferromagnetic material having two parts magnetically coupled to at least two spaced points on said signal core portion, a control winding coupled to said signal core portion and arranged to induce a magnetic control flux in a control flux path passing through said control core portion and through said signal core portion between said two spaced points, a ferromagnetic shunting element extending at least partially between said two parts of the control core portion thereby providing a shunt path to shunt some of the control flux away from said signal core portion, a high reluctance area interrupting said shunt path, and a temperature-responsive structure arranged to decrease the reluctance of said area with increasing temperature, whereby more of said control flux is shunted away from said signal core portion with increasing temperature.

5. A temperature-compensated electrically-variable inductor comprising a signal core portion of ferromagnetic ceramic material, a signal winding coupled to said signal core portion, a control core portion of ferromagnetic material, a control winding coupled to said control core portion and arranged to induce a control flux therein in response to the flow of control current through said control winding, said control core portion being magnetically coupled to said signal core portion whereby said control flux also passes through said signal core portion to control the effective inductance of said signal winding, and a temperature-responsive shunting structure arranged to form a shunt path to shunt some of said control flux away from said signal core portion, said shunting being responsive to increasing temperature to reduce its reluctance.

6. A temperature-compensated electrically-variable inductor as claimed in claim 5 and wherein said shunting structure includes a high-reluctance area in said shunt path and a bi-metallic element associated with said high-reluctance area and arranged to decrease the size of said area with increasing temperature.

7. A temperature-compensated electrically-variable inductor comprising a signal core portion of ferromagnetic ceramic material, said signal core portion having at least one opening therein, a signal winding passing through said opening and arranged to induce in said signal core portion a signal flux passing in a path around said opening, a control core portion of ferromagnetic material having at least two parts thereof coupled to spaced points on said signal core portion, a control winding arranged to induce flux in said control core in a control flux path passing through said control core portion between said two parts, at least a fraction of the control flux in the control flux path passing through said signal core portion between said two spaced points to control the effective inductance of said signal winding, a high reluctance region in series in said signal flux path, thereby controlling the amount of signal flux passing in said signal flux path around said opening, and a temperature-responsive structure connected to said signal core portion and responsive to increasing temperature to increase the size of said high reluctance region, thereby to decrease the effect of said control flux with increasing temperature.

8. A temperature-compensated electrically-variable inductor comprising a ferromagnetic ceramic signal core portion, a signal winding on said signal core portion, a control core portion of ferromagnetic material, a control winding on said control core portion and arranged to produce a control flux therein in response to the flow of control current through said control winding, said control core portion being magnetically coupled to said signal core portion whereby said control flux also passes through said signal core portion, a relatively higher reluctance region in series with said control flux, a source of magnetic flux bridging said region, means defining a gap of low permeability in series with said source of magnetic flux, and manually adjustable means for adjusting said gap, whereby to establish a manually adjustable predetermined flux in said control core in the absence of the flow of any control current in said control winding.

9. A temperature-compensated electrically-variable inductor comprising a signal core portion of ferromagnetic ceramic material, a signal winding on said signal core portion, whereby a signal current flowing in said signal winding induces a signal flux in said signal core portion flowing in a closed path therein, a control core portion of ferromagnetic material having legs adjacent at least two spaced points on said signal core portion, a control winding on said control core portion arranged to induce a magnetic control flux in a control flux path passing through the legs of said control core portion and through said signal core portion between said two spaced points, whereby to regulate the degree of magnetic saturation of said closed signal flux path in said signal core, a non-magnetic gap between at least one of said legs and one of said spaced points, whereby it is in series with said control flux path for regulating the series reluctance of said control flux path, and a temperature-responsive control bridging said gap, said control being responsive to increases in temperature to expand said gap, thereby increasing the effective series reluctance in said control path with increasing temperature.

10. A temperature-compensated electrically-variable inductor comprising a signal core portion of ferromagnetic ceramic material, said signal core portion having two generally C-shaped pieces with their legs adjacent one another to form a closed core path, a signal winding passing around at least one side of said closed core path and arranged to induce in said signal core portion, a signal flux flowing in said path, a control core portion of ferromagnetic material having at least two legs coupled to opposite sides of said closed signal core path, a control winding arranged to induce flux in said control core in a control flux path passing through said legs and through both sides of said closed signal core path, whereby to control the effective inductance of said signal winding, at least one high reluctance region in said closed signal core path at the junction of said C-shaped pieces, thereby controlling the amount of signal flux passing in said closed signal core path, and a temperature-responsive control responsive to increasing temperature to increase the reluctance of said high reluctance region.

11. An electrically-variable inductor comprising: a control core of ferromagnetic material having two spaced legs, at least one control winding on said core, a signal core of ferromagnetic ferrite material bridged across the ends of said spaced legs of the control core, means defining a gap of low permeability between said signal core and said control core, a signal winding on said signal core and securing means to secure said cores together, said securing means having a relatively high temperature coefficient of expansion for varying said gap in response to temperature changes, whereby variations in the control flux in the signal winding vary the flux flowing through said signal core and thus regulate the inductance of the signal winding thereon and effects of changes in temperature are compensated for by said securing means.

12. An electrically-variable inductor comprising: a U-shaped control core of ferromagnetic material, two spaced legs on said core, at least one control winding on said control core, a signal core of ferromagnetic ferrite material adjacent both of the outside surfaces of the ends of said control core and extending between said spaced legs of said control core, said signal core having a skewed slot therein approximately equidistant from said spaced legs, and a signal winding wound through said skewed slot, and fastening means securing said cores together, whereby variations in the current flowing through said control winding serve to regulate the inductance of said signal winding and said skewed slot enables said signal winding to be operated over a wide range of frequencies with reduced magnetostrictive losses in said signal core.

13. A temperature-compensated electrically-variable inductor comprising a signal core portion of ferromagnetic ceramic material, a signal winding on said signal core portion, a control core portion of ferromagnetic material having two parts magnetically coupled to at least two spaced points on said signal core portion, a control winding coupled to said signal core portion and arranged to induce a magnetic control flux in a control flux path passing through said control core portion and through said signal core portion between said two spaced points, at least one relatively high reluctance region in said control flux path near one of said parts, said region being arranged to be temperature responsive so as to increase the reluctance of said region with increasing temperature so as to increasingly restrict the amount of control flux flowing between said control core portion and said signal core portion with increase in temperature, and a ferromagnetic shunting control member extending at least partially between said two parts of the control core portion and positioned between said control winding and said high reluctance region thereby providing a shunt path to shunt some of the control flux away from said region and from said signal core portion, the reluctance of said control member being arranged to be temperature-responsive whereby to decrease its shunt reluctance with increasing temperature to shunt more of said control flux away from said region and from said signal core portion with increasing temperature.

14. An electrically-variable inductor comprising a signal core portion of ferrite, said signal core portion having at least one opening therein, a signal winding coupled to said signal core portion whereby a signal current flowing therein induces a signal flux in said signal core portion in a path passing around said opening, a reluctance region in series with said signal flux path, the reluctance of said region being relatively great with respect to the reluctance of said signal core portion, manually adjustable means for adjusting the effective reluctance of said region, and a control core portion of ferromagnetic material magnetically coupled to said signal core portion and arranged to induce magnetic flux in said signal core portion.

15. An electrically-variable inductor as claimed in claim 14 and wherein said reluctance region is a gap in said signal core extending from said opening across said signal flux path.

16. An electrically-variable inductor comprising a signal core portion of ferrite, said signal core portion having two generally C-shaped pieces with the ends of their legs abutted against one another to form a closed generally oval shaped flux path and a pair of windings on said core portion one of said windings on each side of said core portion adjacent the abutting ends of said legs.

17. An electrically-variable inductor comprising first and second oval shaped cores, each of said cores including a pair of generally U-shaped core pieces having curved portions and straight leg portions with the ends of the straight leg portions of one of the core pieces of each pair adjacent the ends of the straight leg portions of the other core piece of each pair to form a junction, and a winding around one of said junctions.

18. An electrically-variable inductor comprising a signal core portion forming a substantially closed signal flux path, a strip of electrically conductive material wound in a helix around said signal flux path, a ferromagnetic control core piece adjacent said signal core portion at two places and bridged across from one side of said signal flux path to the other, and a control winding around said control core piece.

19. An electrically-variable inductor as claimed in claim 18 and wherein electrically-conductive shims are placed between said control core portion and said signal core portion at the places where said control core portion is adjacent said signal core portion.

20. An electrically-variable inductor comprising a first core portion of magnetizable material having an opening therein, a signal winding on said first core portion and extending through said opening, a control winding surrounding both said first core portion and said signal winding and adapted to carry a control current for inducing control flux in said first core portion for changing the degree of its magnetic saturation to control the inductance of said signal winding, and a second core portion magnetically coupled to said first core portion to provide a relatively low reluctance return path for said control flux.

21. An electrically-variable inductor as claimed in claim 20 and wherein said first core portion and said opening are elongated to form two substantially parallel signal flux paths on opposite sides of said opening, and said signal winding is divided into two portions, each portion of said signal winding being around one of said signal flux paths, and wherein said control winding surrounds said first core portion over the full length of said two signal flux paths.

22. An electrically-variable inductor comprising an elongated signal core portion of magnetizable material having an opening therein, a signal winding on said signal core portion and passing through said opening, and a control winding magnetically coupled to said signal core portion to regulate the degree of magnetic saturation thereof to control the inductance of said signal winding, said opening being elongated and being skewed with respect to the length of said signal core portion.

23. An electrically-variable inductor comprising an elongated signal core portion of magnetizable material having an opening therein, a signal winding on said signal core portion and passing through said opening, and a control winding magnetically coupled to said signal core portion to control the inductance of said signal winding, said signal core portion being divided longitudinally in two places, each division extending from an end of the signal core portion to said opening, said divisions being offset on opposite sides of the longitudinal axis of said signal core portion, whereby said signal winding is enabled to be form wound in two portions one of which is slid in place on each part of the signal core portion.

24. An electrically-variable inductor as claimed in claim 23 and wherein said signal core portion is divided diagonally and said opening is diagonally oriented with respect to the longitudinal axis of said signal core portion.

25. A controllable inductor comprising a core having first and second portions connected in series and forming a substantially closed magnetic path, said first core portion being formed of ferrite and said second portion being formed predominately of iron, a signal winding around and closely coupled to said ferrite core portion, and a control winding surrounding said signal winding and said ferrite core portion.

26. A manually adjustable controllable inductor comprising a core having first and second portions connected in series and forming a substantially closed magnetic flux path, said first core portion being formed of two pieces of ferrite material placed in side-by-side relationship and having a recess in at least one of their adjacent faces forming an opening between said ferrite pieces, a signal winding wound through said opening, means for manually adjusting the spacing between the adjacent faces of said ferrite pieces, said second core portion being formed predominantly of iron, and control winding means arranged to induce magnetic flux in said path for controlling the magnetic saturation of said ferrite core pieces.

27. A controllable inductor for controlling the effective inductance of a signal winding and also providing manual adjustment of said effective inductance including a control winding having an opening passing therethrough, a signal core structure including a pair of substantially identical pieces of ferrite material extending within said opening, said two pieces of ferrite material being in closely spaced face-to-face relationship and having recesses in their adjacent faces forming a hexagonal shaped opening between said ferrite pieces, manual adjusting means for adjusting the spacing between the adjacent faces of said ferrite pieces, a signal winding wound in two halves around each of said ferrite pieces and through said hexagonal opening and connected in series, and magnetically permeable core means extending outside said control winding and providing a flux path between the opposite ends of said signal core structure.

28. A controllable inductor comprising a magnetic core having first and second portions forming a substantially closed magnetic flux path for control flux, said first core portion including two substantially identical pieces of ferrite material in closely spaced adjacent face-to-face relationship, said ferrite pieces having trapezoidal-shaped recesses in their adjacent faces forming an elongated hexagonal opening between said ferrite pieces, a signal winding divided into two portions connected in series and each wound around one of said ferrite pieces and through said opening, and manually adjustable means for adjusting the spacing between adjacent faces of said ferrite pieces, said second core portion being formed predominantly of iron, and control winding means arranged to induce control flux in said magnetic flux path for controlling the saturation of said ferrite pieces and thereby controlling the effective inductance of said signal winding.

29. A controllable inductor for controlling the effective inductance of a signal winding and also providing manual adjustment of said effective inductance, said controllable inductor including magnetically permeable means providing a pair of spaced pole surfaces, and a signal winding sub-assembly, said sub-assembly including a pair of substantially identical core pieces of ferrite material in closely spaced face-to-face relationship and having recesses in their adjacent surfaces forming a slot therebetween, a signal winding divided into two portions and wound around respective ones of said ferrite core pieces and through said slot, supporting means in said sub-assembly for supporting said core pieces extending between said pole surfaces, said sub-assembly including a manually operable adjusting screw carried by said supporting means for adjusting the spacing between adjacent surfaces of said ferrite core pieces for adjusting the effective inductance of said signal winding, and control winding means providing a magnetic field between said pole surfaces extending through said ferrite core pieces for controlling the magnetic saturation of said ferrite core pieces thereby to control the effective inductance of said signal winding.

30. A manually adjustable controllable inductor comprising a core having first and second portions connected in series and forming a substantially closed magnetic flux path, said first core portion being formed of two pieces of ferrite material placed closely adjacent to one another and having a recess in at least one of their adjacent faces forming an opening between said ferrite pieces, a signal winding wound through said opening, means for manually adjusting the spacing between the adjacent faces of said ferrite pieces, said second core portion being formed predominantly of iron, and control winding means arranged to induce magnetic flux in said path for controlling the magnetic saturation of said ferrite core pieces.

References Cited in the file of this patent

UNITED STATES PATENTS

| | | |
|---|---|---|
| 548,230 | Shallenberger | Oct. 22, 1895 |
| 2,063,019 | Bardach | Dec. 8, 1936 |
| 2,126,733 | Catt | Aug. 16, 1938 |
| 2,148,306 | Schwarzhaupt | Feb. 21, 1939 |
| 2,234,002 | Harvey | Mar. 4, 1941 |
| 2,241,912 | Kersten | May 13, 1941 |
| 2,536,260 | Burns | Jan. 2, 1951 |
| 2,703,391 | Gunderson | Mar. 1, 1955 |